(12) United States Patent
Tobon et al.

(10) Patent No.: US 12,403,754 B2
(45) Date of Patent: Sep. 2, 2025

(54) HIDDEN OUTER BELT SEAL

(71) Applicant: Rivian IP Holdings, LLC, Plymouth, MI (US)

(72) Inventors: David Tobon, Northville, MI (US); Benjamin Mumma, Huntington Woods, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 18/135,912

(22) Filed: Apr. 18, 2023

(65) Prior Publication Data
US 2024/0351412 A1   Oct. 24, 2024

(51) Int. Cl.
*B60J 10/75*   (2016.01)
*B60J 10/76*   (2016.01)

(52) U.S. Cl.
CPC ............... *B60J 10/75* (2016.02); *B60J 10/76* (2016.02)

(58) Field of Classification Search
CPC ............. B60J 10/75; B60J 10/20; B60J 10/76
USPC .......................................................... 49/377
See application file for complete search history.

(56) References Cited

U.S. PATENT DOCUMENTS

| | | | | |
|---|---|---|---|---|
| 2,198,290 A | * | 4/1940 | Place ...................... | B60J 10/75 49/492.1 |
| 2,523,839 A | * | 9/1950 | McKinney ............... | B60J 10/75 49/492.1 |
| 2,664,603 A | * | 1/1954 | McKinney ............... | B60J 10/75 49/377 |
| 2,913,783 A | * | 11/1959 | Bright ...................... | B60J 10/75 49/377 |
| 3,203,059 A | * | 8/1965 | Becker ..................... | B60J 10/75 24/336 |
| 3,359,688 A | * | 12/1967 | Kondolf ................... | B60J 10/75 49/490.1 |
| 3,583,757 A | * | 6/1971 | Wilfert .................... | B60R 13/07 296/84.1 |
| 3,763,596 A | * | 10/1973 | Anderson ................ | B60J 10/75 49/492.1 |
| 4,330,959 A | * | 5/1982 | Nishikawa ............... | B60J 10/75 49/377 |

(Continued)

FOREIGN PATENT DOCUMENTS

| | | | | |
|---|---|---|---|---|
| CN | 1850524 B | * | 9/2011 | ............. B60J 10/24 |
| CN | 102652071 A | * | 8/2012 | ............ B60J 5/0413 |

(Continued)

*Primary Examiner* — Catherine A Kelly
(74) *Attorney, Agent, or Firm* — Haley Guiliano LLP (57) ABSTRACT

Various examples of a window seal for a door assembly, e.g., for a vehicle, a door assembly, and a method of making a seal or door assembly are provided. A window seal may include a longitudinally extending channel having a cross section opened toward a moveable window. The belt seal structure may further comprise an insert having a base received longitudinally in the channel. An example door assembly may include an exterior door panel having a visible exterior surface and an interior surface. The door assembly may further comprise a window seal having a channel extending along the interior surface and an insert comprising a base received longitudinally in the channel. Example inserts may comprise a sealing lip extending laterally out of the channel to contact the moveable window.

19 Claims, 7 Drawing Sheets

(56) References Cited

U.S. PATENT DOCUMENTS

| | | | | |
|---|---|---|---|---|
| 4,442,634 | A * | 4/1984 | Kimura | B60J 10/17 49/377 |
| 4,481,736 | A * | 11/1984 | Norton | B60J 10/75 49/377 |
| 4,817,336 | A * | 4/1989 | Kisanuki | B60J 10/21 49/377 |
| 4,860,494 | A * | 8/1989 | Fujii | B60J 10/75 49/377 |
| 5,054,240 | A | 10/1991 | Nakahara et al. | |
| 5,085,005 | A * | 2/1992 | Yasukawa | B60J 10/244 15/250.1 |
| 5,275,455 | A | 1/1994 | Harney et al. | |
| 5,339,488 | A * | 8/1994 | Maass | B60J 10/248 15/250.19 |
| 5,353,549 | A * | 10/1994 | Henderson | B60J 10/75 49/492.1 |
| 5,388,371 | A * | 2/1995 | Nozaki | B60J 10/265 49/377 |
| 5,495,693 | A * | 3/1996 | Tiesler | B60J 1/17 296/146.3 |
| 5,607,198 | A * | 3/1997 | Wirsing | B60J 1/17 49/492.1 |
| 5,815,985 | A * | 10/1998 | Nishida | B60J 10/265 49/377 |
| 5,970,659 | A * | 10/1999 | Oord | B60J 10/75 49/377 |
| 6,070,364 | A * | 6/2000 | Berry | B60J 10/75 49/495.1 |
| 7,210,730 | B2 | 5/2007 | Fujita et al. | |
| 7,390,050 | B2 | 6/2008 | Nakao et al. | |
| 7,407,205 | B2 | 8/2008 | Nakao et al. | |
| 8,549,790 | B2 * | 10/2013 | Murree | B60J 10/75 49/377 |
| 9,649,994 | B2 * | 5/2017 | Masuda | B60J 10/16 |
| 10,035,411 | B2 * | 7/2018 | Toyota | B60J 10/50 |
| 10,232,694 | B2 * | 3/2019 | Alhof | B60J 10/88 |
| 10,442,276 | B2 * | 10/2019 | Kunapareddy | B60J 10/75 |
| 11,938,792 | B2 * | 3/2024 | Filipczak | B60J 10/75 |
| 2005/0126077 | A1 * | 6/2005 | Cittadini | B60J 10/38 49/377 |
| 2007/0227072 | A1 * | 10/2007 | Kawase | B60J 10/75 49/377 |
| 2013/0061532 | A1 * | 3/2013 | Dishman | B60J 10/32 24/570 |
| 2019/0061503 | A1 * | 2/2019 | Filipczak | B60J 1/2097 |
| 2023/0118935 | A1 * | 4/2023 | Warmington | B60J 5/0415 49/493.1 |
| 2025/0065703 | A1 * | 2/2025 | Li | B60J 10/76 |
| 2025/0083508 | A1 * | 3/2025 | Che | B60J 10/75 |

FOREIGN PATENT DOCUMENTS

| | | | | |
|---|---|---|---|---|
| CN | 111890902 | A * | 11/2020 | B60J 10/76 |
| DE | 3615078 | A1 * | 11/1987 | |
| FR | 2865969 | A1 * | 8/2005 | B60J 10/75 |
| FR | 3047930 | A1 * | 8/2017 | B60J 10/16 |
| FR | 3051731 | A1 * | 12/2017 | B60J 10/273 |
| IT | 1218687 | B * | 4/1990 | B60J 1/001 |
| JP | 2003252055 | A * | 9/2003 | B60J 10/75 |
| JP | 2004249745 | A * | 9/2004 | B60J 10/75 |
| KR | 19980013375 | U * | 6/1998 | |
| KR | 20060060862 | A * | 6/2006 | |
| KR | 100892492 | B1 * | 4/2009 | |

* cited by examiner

HIDDEN OUTER BELT SEAL

INTRODUCTION

The present disclosure is directed to systems and methods for providing an outer belt seal for a vehicle door assembly that remains generally hidden and, more specifically, to systems and methods for installing an outer belt seal that remains hidden and facilitates service and replacement.

SUMMARY

Belt line seals are utilized to create a seal against an actuated window within a door assembly to limit or prevent the intrusion of fluids into the body of the door assembly. A belt line seal is positioned between a door panel and a surface of the actuated window. Belt line seals are typically secured to an upper edge of a door panel with at least a portion of the seal or associated cladding being visible adjacent window glass. These elements are typically molded and cannot be painted to match exterior surfaces of the door panel assembly, and as such may create unsightly or otherwise undesirable interruptions or blemishes in vehicle styling. There is a desire to eliminate the belt line seal from view to improve vehicle aesthetics, however moving the seal to locations hidden from view inherently makes servicing or replacing the seal more difficult. As a result, a compromise generally must be struck between serviceability and vehicle styling, particularly for vehicles used in commercial applications or where an extended service life is otherwise expected.

Accordingly, in at least some example approaches herein, a vehicle window seal is provided comprising a longitudinally extending channel having a cross section opened toward a moveable window. The belt seal structure may further comprise an insert having a base received longitudinally in the channel. The insert comprises a sealing lip extending laterally out of the channel to contact the moveable window.

In at least some examples, the base comprises at least one protrusion configured to contact one or more inner surfaces of the channel to retain the insert in the channel by creating friction between the at least one protrusion and the one or more inner surfaces.

In at least some examples, the at least one protrusion comprises a plurality of protrusions, each extending in a different direction from the base.

In at least some example illustrations, the channel defines a c-shaped cross section.

In at least some examples, the channel defines opposing interior surfaces engaged by upper and lower protrusions of the base.

In at least some examples, the base defines a hollow cross section, with the sealing lip defined by a protrusion extending away from the hollow cross section. The base may also comprise one or more protrusions configured to contact one or more inner surfaces of the channel.

In at least some example approaches, the sealing lip comprises a layer of wear resistant material that prevents marks from appearing on a glass window.

In at least some example illustrations, the base of the insert defines a locking pin structure configured to extend through a lock aperture defined by the channel.

In at least some examples, the locking pin structure is integrally formed with the base.

In at least some example approaches, the locking pin structure extends laterally away from the window.

In at least some example illustrations, the locking pin structure is located longitudinally on the base such that the locking pin structure is received in the lock aperture when the base is fully inserted into the channel.

In at least some examples, the channel comprises a locator tab configured to limit longitudinal insertion of the base of the insert into the channel.

In at least some examples, the belt seal structure comprises a door panel having an interior surface defining the longitudinally extending channel.

Additional examples herein are directed to a door assembly comprising an exterior door panel having a visible exterior surface extending toward a window opening for a moveable window. The exterior door panel also has an interior surface. The door assembly further comprises a window seal having a longitudinally extending channel extending along the hidden interior surface, the channel having a cross-section opened toward the moveable window. The window seal also comprises an insert having a base received longitudinally in the channel. The insert comprises a sealing lip extending laterally out of the channel to contact the moveable window.

In at least some example illustrations, the door assembly defines an access hole aligned with channel for withdrawing the insert longitudinally from the channel and out of the door assembly.

In at least some example approaches, the base of the insert defines a locking pin structure configured to extend through a lock aperture defined by the base of the channel. Further, in these examples the channel may have a locator tab configured to limit longitudinal insertion of the base of the insert into the channel.

In at least some examples, the locking pin structure is integrally formed with the base. Additionally, the locking pin structure may be located longitudinally on the base such that the locking pin structure is received in the lock aperture when the base is fully inserted into the channel.

Example illustrations are also directed to a method of manufacturing a door assembly. In an example, the method comprises positioning a longitudinally extending channel along an interior surface of a door panel. The method may further include inserting a base of an insert longitudinally into the channel. The insert may have a sealing lip extending laterally out of the channel to contact a moveable window.

In at least some example methods, the method further comprises sealing an access hole defined by the door panel with a removeable plug. The access hole may be aligned with the channel such that the insert is configured to be withdrawn longitudinally from the channel and out of the door assembly through the access hole.

In at least some examples, a method further includes limiting longitudinal insertion of the base of the insert into the channel with a locator tab of the channel, wherein the base of the insert defines a locking pin structure configured to extend through a lock aperture defined by the base of the channel when the insert is fully inserted longitudinally into the channel. The locking pin structure may in at least some examples be integrally formed with the base.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for providing an outer belt seal that generally remains hidden from view from users/drivers of the vehicle and observers outside the vehicle. The belt seal may be generally concealed within a door assembly such that it is hidden from view during normal use. Nevertheless, the belt seal may also facilitate service and/or replacement of sealing element(s) in contact with moveable windows, e.g., as may be useful for high-mileage or high-usage vehicles. For example, as will be described further below, a belt seal structure may have a removeable insert that can be withdrawn from a door assembly without requiring disassembly of the door assembly or special tools to access the insert.

Figure 1:
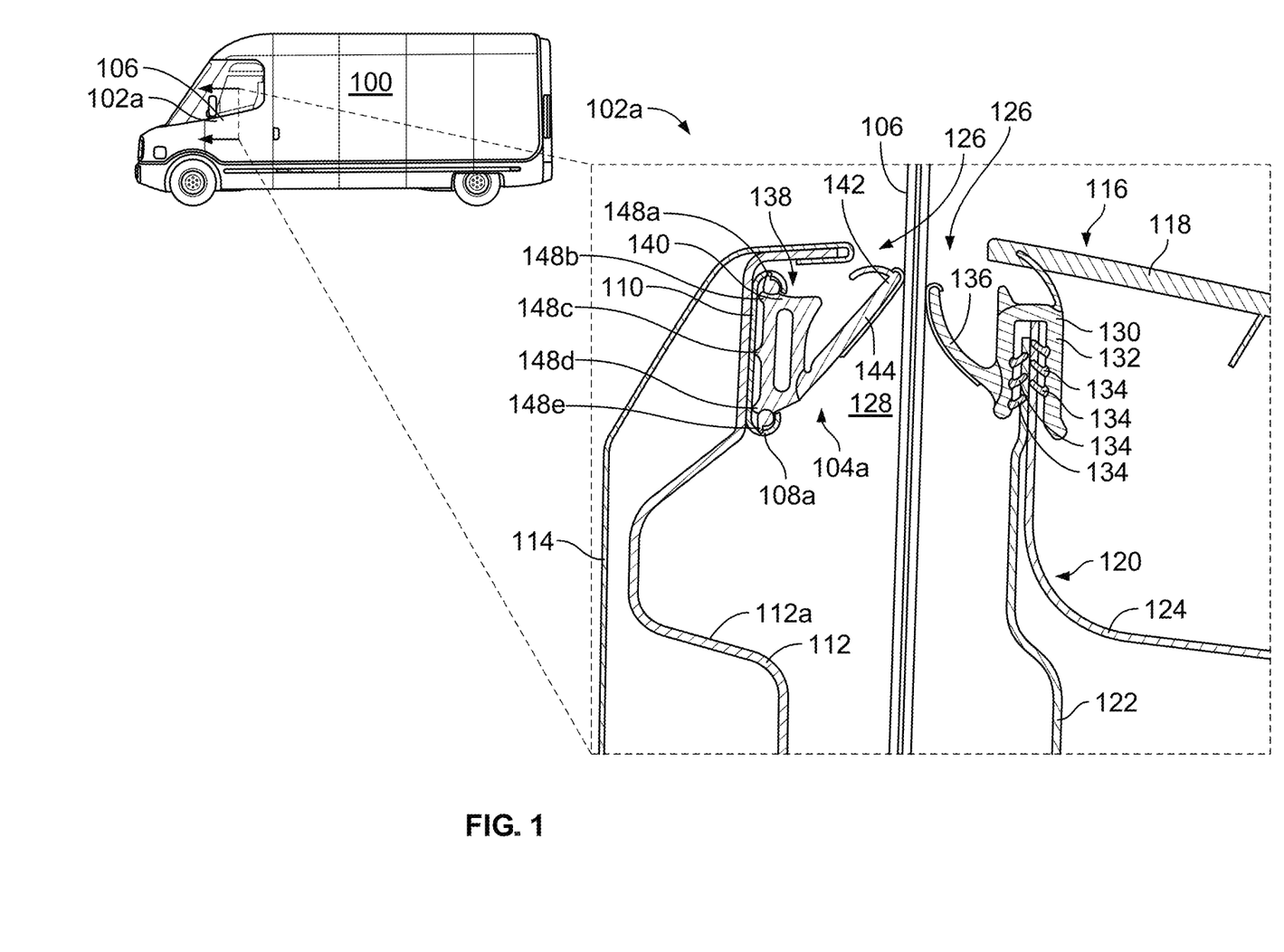
FIG. 1 illustrates an example door assembly incorporating a belt seal assembly that remains generally hidden from view and comprises a channel and insert to facilitate service and/or replaceability, in accordance with some disclosed embodiments.

Turning now to FIG. 1, a vehicle 100 having an example door assembly 102a is illustrated that incorporates a window seal (e.g., a belt seal structure for a vehicle, or vehicle window seal) or assembly 104a with features that facilitate positioning of a seal such that it remains generally hidden when installed, and also allows for relatively easy removal and/or replacement. The door assembly 102a generally houses a moveable window 106. The window 106 may be formed of glass, e.g., safety glass, and may translate vertically within the door assembly 102a. Merely by way of example, the window 106 may be moved vertically up/down by a crank or electrically powered actuator. The window seal 104a generally comprises a longitudinally extending channel 108a having a base 110 adjacent the moveable window 106. The channel 108a generally faces toward the window 106. As illustrated in FIG. 1, the window seal 104a may be positioned adjacent a lower portion of a window opening, such that the window seal 104a is positioned along a beltline of the vehicle.

The door assembly 102a may have any construction that is convenient. As shown in the example in FIG. 1, the inner door panel 112 may be joined at an upper edge thereof with an exterior door panel 114, e.g., via a press such as a hemming press or the like. The inner door panel 112 and exterior door panel 114 may be joined around an entire perimeter of each in similar manner as shown along the upper edge, thereby forming an outer door assembly. The outer door assembly may be joined with an interior door assembly 116. The interior door assembly 116 may include a trim panel 118 mounted to an interior door structure 120. The interior door structure 120 may comprise an interior inner panel 122 and interior outer panel 124, which may be hemmed or otherwise joined together in any manner that is convenient. The interior door structure 120 may be joined with the exterior door panel 114 and/or inner door panel 112 along front, rear, and bottom sides of the door assembly 102a, with a window opening 126 being defined along an upper end of the door assembly 102a. The window 106 may protrude through the window opening when raised vertically by the actuator, and may be withdrawn into an interior 128 of the door assembly 102a when lowered.

An interior seal 130 may be secured to an upper edge of the interior inner panel 122 in any manner that is convenient. In the example illustrated, the seal 130 includes a base 132 having a plurality of fingers 134 that are resiliently engaged with the interior inner panel 122. The interior seal 130 also has a sealing arm 136 extending away from the base to engage the window 106. The sealing arm 136 may generally remain in contact with the window 106 during raising/lowering of the window 106, and may thereby generally "wipe" foreign objects, liquid, dust, etc. from the interior surface of the window 106. The sealing arm 136 may also generally prevent foreign objects, liquid, or the like from falling into the door assembly 102a from an interior side of the window 106.

In the example illustrated, the channel 108a is formed as a separate component and secured to an inner door panel 112. While the channel 108a is generally formed as a separate component from the inner door panel 112, in other examples that will be described further below a channel may be formed directly in the inner door panel. In any case, the channel 108a is illustrated in FIG. 1 having a cross section opened toward the moveable window 106.

The window seal 104a may have an insert 138 that is received longitudinally in the channel 108a. More specifically, as illustrated in FIG. 1 the insert 138 has a base 140 that is received longitudinally in the channel 108a. The insert 138 and channel 108a may each have a generally consistent cross section longitudinally with respect to the door assembly 102a and/or the vehicle 100 (i.e., longitudinally being oriented in a front-to-rear direction of the vehicle 100). Accordingly, the insert 138 may be slid into the channel 108a. Further, as will be discussed below in more detail, the insert 138 may be configured to be removed from the channel 108a. The insert 138 may be configured to seal against the window 106, e.g., to prevent intrusion of contaminants, water, or the like into the door assembly 102a. Accordingly, the insert 138 may be provided with a sealing lip or other feature to engage or contact the window. In the example illustrated in FIG. 1, the insert 138 comprises a sealing lip 142 extending laterally out of the channel to contact the moveable window 106. The base 140 generally has a hollow cross section, e.g., to facilitate compression for fitting within the channel 108a. More specifically, the sealing lip 142 is defined by a protrusion or arm extending away from the hollow cross section of the base 140. More specifically, arm 144 extends away from the base 140 such that the arm 144 extends generally upwardly to the sealing lip 142, with the sealing lip 142 positioned at an end of the arm 144 to contact the window 106. Accordingly, in similar manner as the sealing arm 136 on the interior side of the window 106, the sealing lip 142 generally remains in contact with the window 106 and may "wipe" liquid, dust, etc. from an exterior surface of the window 106. The sealing lip may have a layer of wear resistant material that prevents marks from appearing on the window 106, which as noted above may be formed of a glass material. Example wear resistant materials may generally reduce drag/friction on a contact surface of a glass window, e.g., window 106, and also prevent marks from appearing on the glass window. Wear resistant materials may be a coating or a secured separate layer of material. Further, the sealing lip 142 may prevent foreign objects, liquid, or the like from falling into the door assembly 102a from an exterior side of the window 106.

Figure 2A:
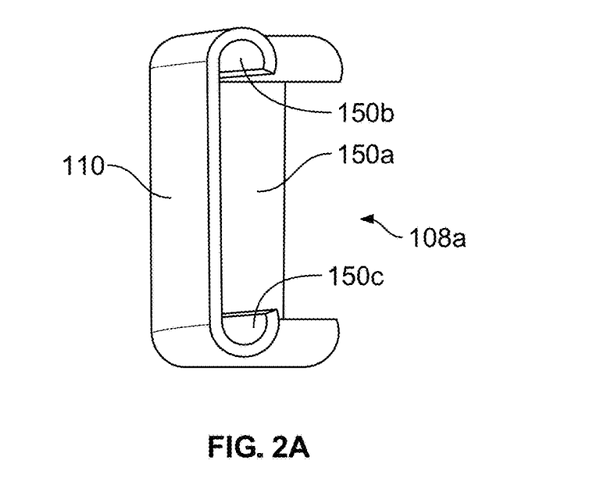
FIG. 2A is an end view of the channel of FIG. 1, in accordance with some disclosed embodiments.
Figure 2B:
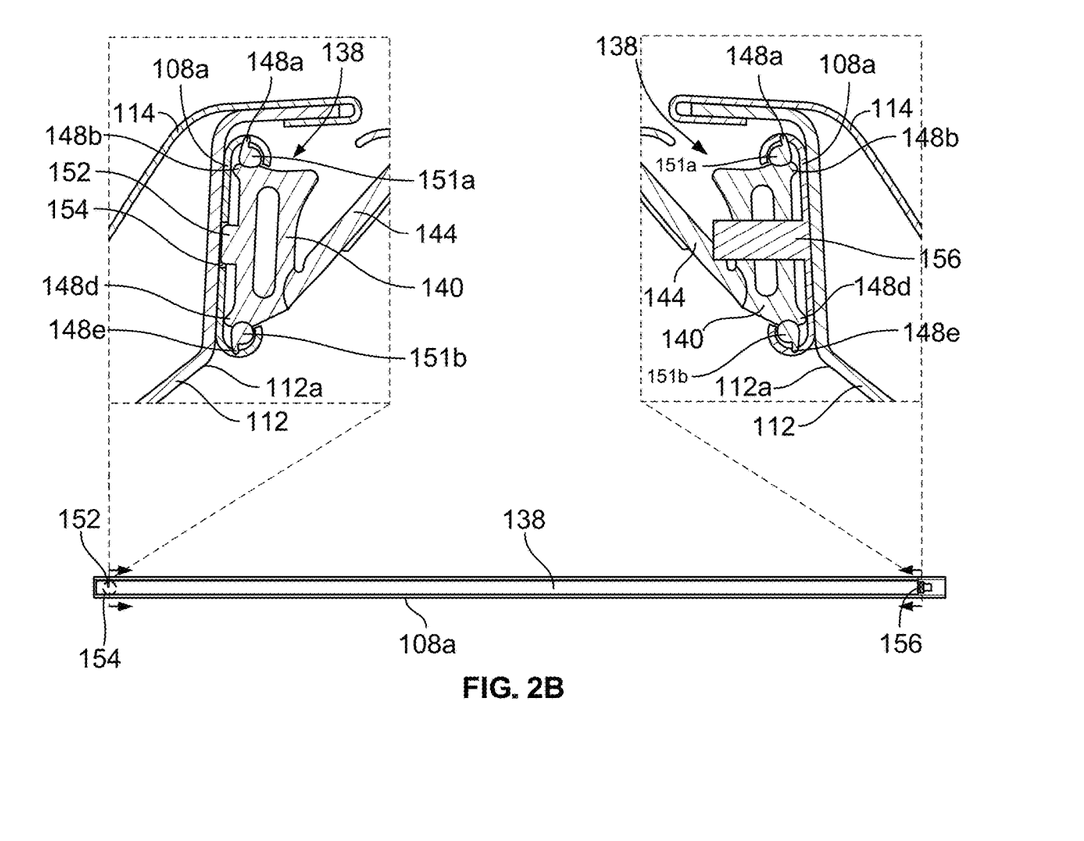
FIG. 2B is a side view of the channel of FIG. 2A, in accordance with some disclosed embodiments.

As seen in FIGS. 1 and 2, the base 140 may have one or more lobes 151a, 151b (collectively, 151) which may facilitate retention of the base 140 within the channel 108a. More specifically, an upper lobe 151a is disposed along an upper portion of the base 140 such that it contacts upper curved surface 150b of the channel 108a, while a lower lobe 151b is disposed along a lower portion of the base 140 such that it contacts lower curved surface 150c of the channel 108a. The upper and lower curved surfaces 150b, 150c may generally wrap around the corresponding lobes 151, e.g., such that the curved surfaces 150b, 150c each laterally restrain their respective lobes 151 on opposite sides thereof.

The base 140 may include one or more additional features that generally facilitate retention of the insert 138 within the channel 108a. For example, as illustrated in FIG. 1, the base 140 may have protrusions 148a, 148b, 148c, 148d, and 148e (collectively, 148) that are configured to engage with one or more interior surfaces of the channel 108a when the insert 138 is longitudinally inserted into the channel 108a. Generally, the additional friction provided by the protrusions works in combination with the lobes 151 being retained within the curved surfaces 150b, 150c to retain the base 140 within the channel 108a. However, in some example approaches only one of these two features, or none, are present. In the example illustrated in FIG. 1, the base 140 includes protrusion 148a which projects vertically upward from the base 140, protrusions 148b, 148c, and 148d which project laterally away from the base 140 and window 106, and protrusion 148e which projects vertically downward from the base 140. However, any number of protrusions 148 may be employed that is convenient, and the protrusions 148 may have any configuration that is convenient. Moreover, in at least some example approaches the base 140 is without any protrusions 148 (e.g., where an elasticity or compliance of the base 140 is sufficient to allow the base 140 to be adequately retained within the channel 108a without the protrusions 148). One or more of the protrusions 148, and in some cases all of the protrusions 148, may extend longitudinally along the base 140, and as such each of the protrusions 148 may thereby defining one or more corresponding ridges along the base 140. The protrusions 148 may each be in contact with interior surfaces 150 of the channel 108a. The base 140 and protrusions 148 (and, for that matter, all other components/portions of the insert 138) may be formed of a resilient material such as rubber or other thermoplastic vulcanizates, or the like, that is configured to deflect or compress, allowing the base 140 to be radially "squeezed" into the channel 108a. In some examples, protrusion(s) 148 are formed integrally with the base 140, e.g., via an extrusion process. Accordingly, the protrusions 148 may each make contact with inner surfaces 150 of the channel 108a, and may retain the insert 138 an opening defined by the channel 108a. More particularly, the protrusions 148 each generally create or increase friction between the protrusions 148, respectively, and inner surface(s) 150 contacted by the protrusion 148. The protrusions 148 may deflect to allow the base 140 to be received within the channel 108a. Accordingly, absent application of a sufficient longitudinal force applied to the insert 138 to remove from the channel 108a, the insert 138 may remain resiliently retained within the channel 108a. It should be noted that protrusions 148 or other gripping features or gripping structure may have different shapes or dimensions than those depicted, and may incorporate additional features to enable the base 140 to remain resilient retained within the depicted channel 108a.

Referring now to FIGS. 1, 2A, and 2B, the channel 108a is illustrated and described in further detail. The channel 108a, as noted above, is generally opened toward the window 106. The channel 108a may define a c-shaped cross section. Interior surfaces 150 of the channel 108a generally facilitate retention of the insert 138 within the channel 108a, e.g., via one or more protrusions 148 as noted above. More specifically, the interior surfaces 150 include a base surface 150a, an upper curved surface 150b, and a lower curved surface 150c. the upper and lower curved surfaces 150b, 150c are opposing surfaces. For example, the surfaces 150b and 150c face each other such that the protrusions 148 associated with each may deflect in opposition to each other. Accordingly, the base 140 of the insert 138 is resiliently retained within the channel 108a. Absent a longitudinally applied force overcoming the friction between the base 140 and the interior surfaces 150, the insert 138 may generally remain within the channel 108a. In some examples, it may be desirable to remove the insert 138 from the channel 108a, e.g., to allow service and/or replacement of the insert 138.

Referring now to FIG. 2B, the base 140 of the insert 138 may define a locking pin structure 152 configured to extend through a lock aperture 154 defined by the channel 108a when the insert 138 is fully inserted longitudinally into the channel 108a. While the locking pin structure 152 is illustrated as being formed integrally with the base 140 of the insert 138, any configuration of the locking pin structure 152 may be employed that is convenient. For example, a separate pin or other structure may be provided that extends laterally through the insert 138 and channel 108a, thereby generally preventing longitudinal movement of the insert 138 within the channel 108a. Further, at an opposite end of the channel 108a from the lock aperture 154, a locator tab 156 of the channel 108a protrudes into the channel 108a, thereby preventing over-insertion of the insert 138. Accordingly, the locator tab 156 may limit longitudinal insertion of the base 140 of the insert 138 into the channel 108a. The locator tab 156 may thereby prevent over-insertion or otherwise incorrect positioning of the insert 138 within the channel 108a. The insert 138 may be sized longitudinally so that as the insert 138 is installed by longitudinal insertion into the channel 108a, an end of the insert 138 abuts the locator tab 156 as the locking pin structure 152 reaches the lock aperture 154. The locking pin structure 152 and locator tab 156 may each further enhance the degree to which the insert 138 is resiliently retained within the channel 108a after installation/insertion. Nevertheless, the insert 138 may still be removed from the channel 108a by application of sufficient longitudinal force, e.g., in a direction opposite that for insertion/installation of the insert 138 to the channel 108*a*, to thereby dislodge the locking pin structure 152 from the lock aperture 154. (It should be noted that in examples where the locking pin is a separate part from the insert 138/base 140, it may be necessary or desirable to first remove the pin before sliding the insert 138 longitudinally out of the channel 108*a*.) Accordingly, the insert 138 may be withdrawn from the channel 108*a* for service and/or replacement of the insert 138. Additionally, to the extent the locking pin structure 152 or other features of the insert 138 make the insert 138 asymmetrical longitudinally, an "insertion end" of the insert 138 is more clearly identified, and may facilitate insertion of the insert 138 in the designed orientation. Put another way, the locking pin structure 152 provides a visual cue as to the non-insertion end of the insert 138, facilitating correct insertion of the opposite end of the insert 138 into the channel 108 by manufacturing or service personnel. While the locking pin structure 152 and/or the locator tab 156 may enhance retention of the insert 138 or provide other benefits such as described above, it should be noted that in some example approaches a locking pin (e.g., locking pin structure 152) and locator tab 156 may not be needed. For example, to any extent friction between the channel 108*a* and the base 140 is generally sufficient to retain the insert 138 in a desired longitudinal position in the channel 108*a*, it may not be necessary to provide a locking pin (e.g., locking pin structure 152) or locator tab 156. For example, an elasticity/compliance and/or shape of the base 140 may, in some cases, be sufficient to retain the base 140 securely within the channel 108*a*. Moreover, other features may be provided as alternatives to the locking pin structure 152 and/or locator tab 156. Merely as one examples, an end cap or cover in the channel 108*a* may retain the insert 138 within the channel 108*a*, and/or a pin formed as a separate part from the insert 138 may be passed through the insert 138 and the channel 108*a* after the insert 138 is installed.

As noted above, the channel 108*a* in the example illustrated in FIG. 1 is configured to be secured to an interior surface of inner door panel 112. The channel 108*a* may be formed as a separate component and secured to interior surface 112' of the inner door panel 112. The channel 108*a* may be formed in any manner of any material that is convenient. In an example, the channel 108*a* is stamped or rolled, e.g., using a sheetmetal blank, and then welded or bonded to the interior surface 112'. In another example, the channel 108*a* is extruded or molded of a plastic, polypropylene, or nylon material, and secured to the interior surface 112' via one or more clips (not shown), or via bonding, merely as examples.

In another example approach, a channel may be defined by a door panel itself, rather than being formed as a separate component. For example, referring now to FIG. 3., another example door assembly 102*b* having a window seal 104*b* is illustrated. The window seal 104*b* comprises insert 138, which is received in a channel 108*b* defined by an interior door panel 113. More specifically, an interior surface 113' of the door panel 113 defines the longitudinally extending channel 108*b*. The general shape and structure of the channel 108*b* of the interior door panel 113 may generally be the same as described above regarding channel 108*a*, e.g., with the channel 108*b* extending longitudinally along the interior door panel 113 to allow insertion of the same insert 138 described above. Additionally, the insert 138 may, in at least some examples, be identical in FIG. 3 to the example seal illustrated in FIGS. 1-2 and described above.

In each of the foregoing example window seals 104*a* and 104*b*, components may generally remain hidden from view, e.g., from outside the vehicle. For example, a visible exterior surface 114' of the exterior door panel 114 generally extends toward the window opening 126 for window 106, with the window seals 104*a*/104*b* concealed within the door assembly 102*a*/102*b*, as respectively seen in FIGS. 1 and 3. More particularly, the door assembly 102*a*/102*b* has an interior surface that remains hidden, and to which the channel 108*a* is attached as shown in FIG. 1. Similarly, in the example illustrated in FIG. 3, the channel 108*b* is defined by interior door panel surface 113', which remains hidden from view. Accordingly, the window seals 104*a* and 104*b* are generally not visible from outside the door assemblies 102*a*/102*b*, enhancing aesthetic appeal of the vehicle 100.

Figure 4A:
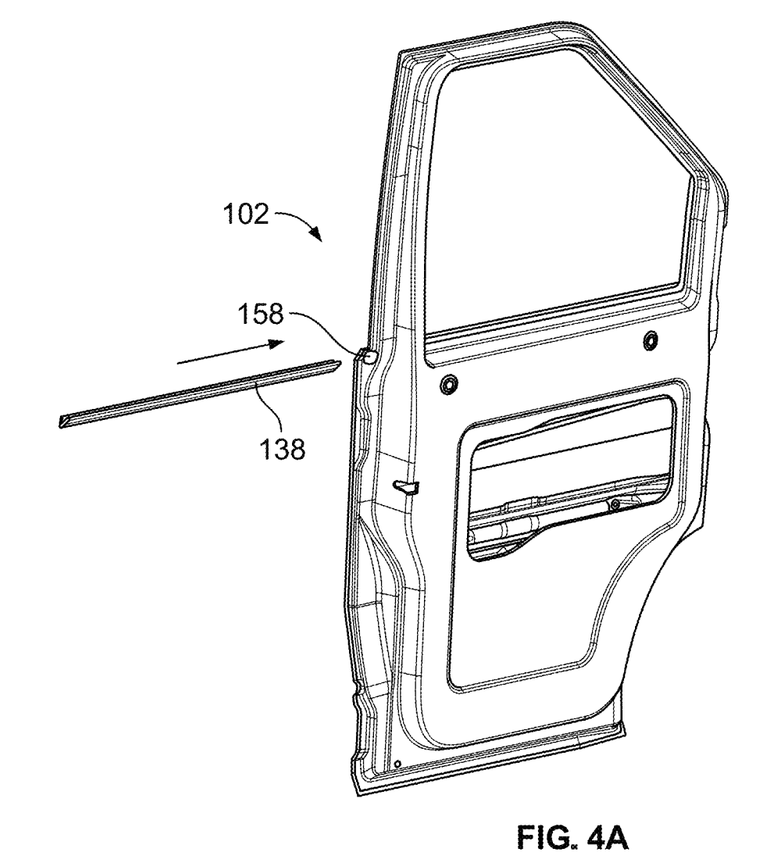
FIG. 4A illustrates the door assembly of FIG. 1 or FIG. 3, illustrating the insert aligned for insertion into to the channel and/or the door assembly, in accordance with some disclosed embodiments.
Figure 4B:
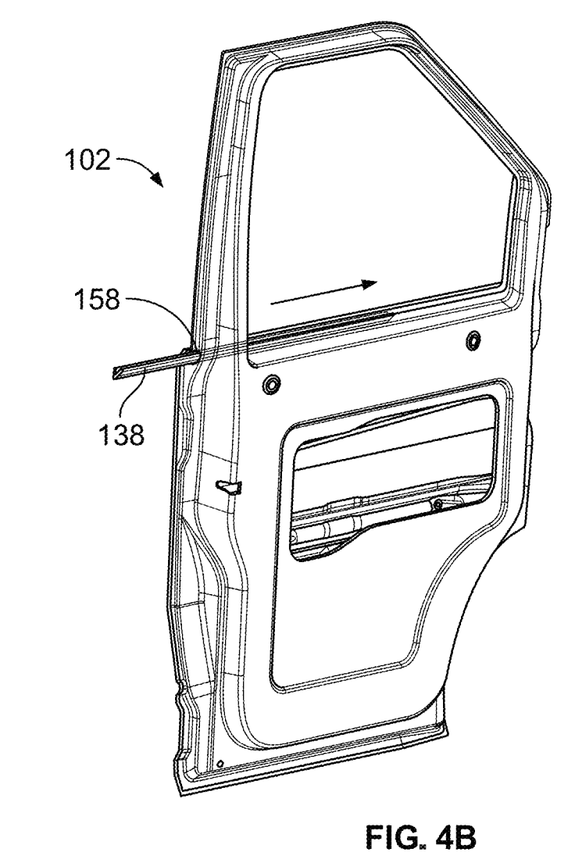
FIG. 4B illustrates the door assembly of FIG. 4A, illustrating the insert partially inserted into the channel and the door assembly, in accordance with some disclosed embodiments.
Figure 5A:
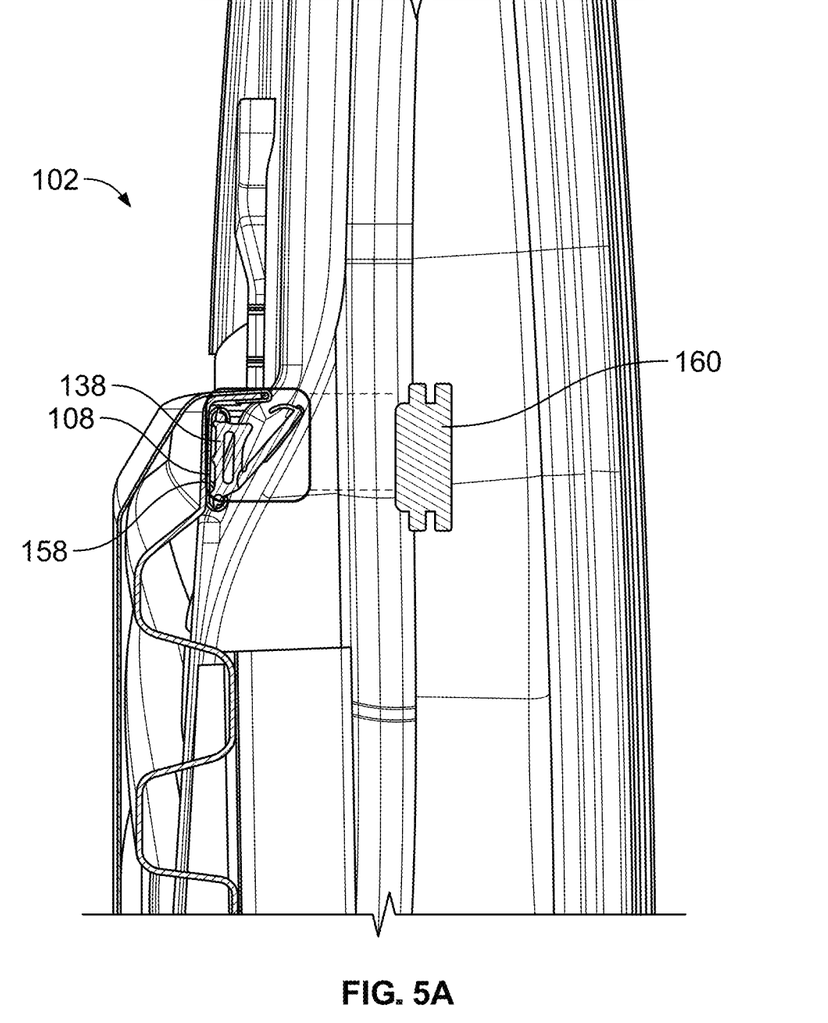
FIG. 5A illustrates the door assembly of FIG. 1 or FIG. 3, illustrating an access hole of the door assembly and a removeable plug, in accordance with some disclosed embodiments.
Figure 5B:
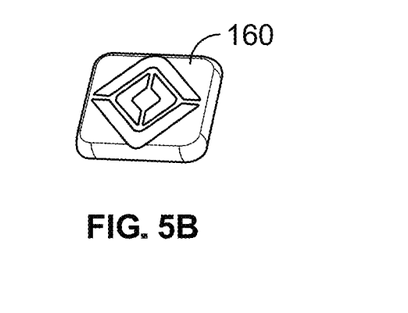
FIG. 5B illustrates the removeable plug of FIG. 5A, in accordance with some disclosed embodiments.

Referring now to FIGS. 4A and 4B, door assembly 102 may define an access hole 158, e.g., at an end of the door assembly 102 adjacent a free end (i.e., non-hinged or rearward end) of the door assembly 102. The insert 138 is illustrated being inserted into the access hole 158, e.g., in an installation or replacement procedure, in FIG. 4A. The insert 138 may be inserted further into the channel 108, e.g., as shown in FIG. 4B.

The access hole 158 may, in some example approaches, be aligned with channel 108 with respect to the longitudinal direction of insertion/removal of the insert 138 to the channel 108. Accordingly, for the insert 138 may with withdrawn longitudinally from the channel 108 and out of the door assembly 102 via the access hole 158. Additionally, a removeable plug 160 may be provided that is configured to seal the access hole 158 and/or the door assembly 102, or otherwise prevent ingress of liquid, dirt, debris, etc. into the door assembly 102 via the access hole 158.

Figure 6A:
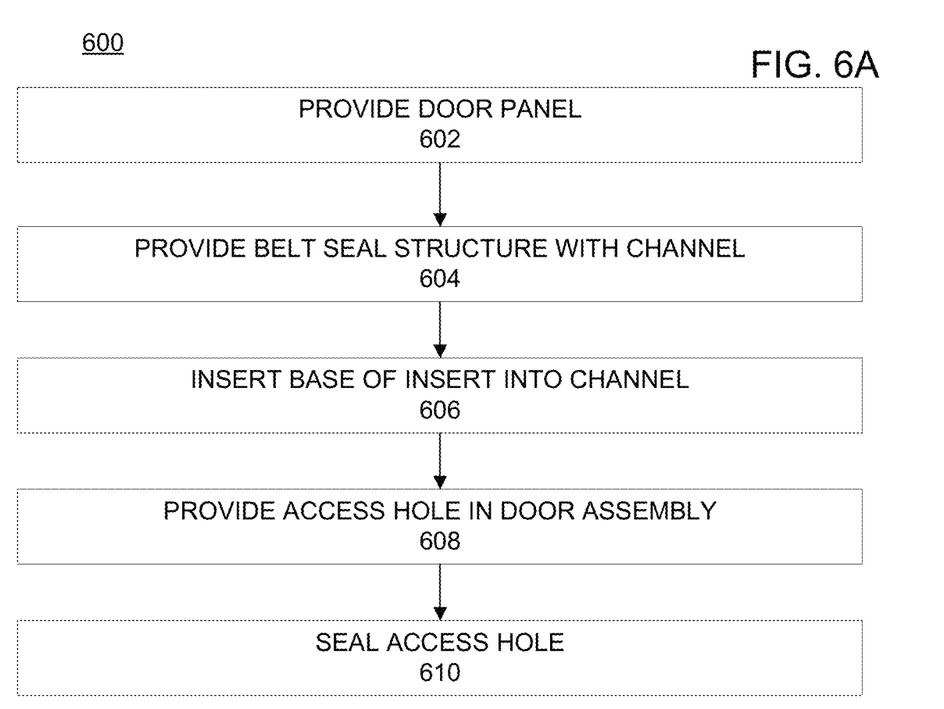
FIG. 6A illustrates an example method for manufacturing a door assembly that incorporates a belt seal assembly, in accordance with some disclosed embodiments.

Referring now to FIG. 6A, an example process 600 for manufacturing a door assembly, e.g., that incorporates a belt seal structure, is illustrated and described in further detail. Method 600 may incorporate or be used to manufacture aspects of door assembly 102*a* of FIG. 1, door assembly 102*b* of FIG. 3, and/or vehicle 100 of FIG. 1, in accordance with some embodiments of this disclosure.

Process 600 may begin at block 602. At block 602, process 600 may provide an exterior door panel. For example, as discussed above, an exterior door panel 114 may be provided having a visible exterior surface 114' extending toward a window opening 126 for a moveable window 106. Further, the exterior door panel 114 and/or may have a hidden interior surface, of an inner door panel 112. Process 600 may then proceed to block 604.

At block 604, process 600 may provide a belt seal structure, e.g., window seal 104*a* or 104*b*. For example, as described above, a base of a longitudinally extending channel may be positioned along or upon the hidden interior surface of the door assembly 102. In some examples, a channel 108*a* may be a separate component that is secured to the interior surface 112'. In another example described above, a channel 108*b* is provided that is defined by an interior surface 113' of the door panel. In either case, the channel 108*a*/108*b* is generally opened toward the moveable window 106.

Proceeding to block 606, process 600 may further include inserting a base of an insert longitudinally into the channel. For example, as described above an insert 138 may have a base 140 which may be longitudinally inserted into channel 108*a* or 108*b*. Additionally, the insert 138 may have a sealing lip 142 extending laterally out of the opened channel 108 to contact the moveable window 106. In some examples, process 600 may also limit longitudinal insertion of the base 140 of the insert 138 into the channel 108, e.g., with a locator tab 156 of the channel 108 as described above. Furthermore, in some examples as discussed above, the base 140 of the insert 138 may define a locking pin structure 152 configured to extend through a lock aperture 154 defined by the channel 108. For example, when the insert 138 is fully inserted longitudinally into the channel 108, the locking pin structure 152 may be positioned such that it extends through the lock aperture 154, thereby enhancing longitudinal securement of the insert 138 within the channel 108. Process 600 may then proceed to block 608.

At block 608, process 600 may provide an access hole in the door assembly. For example, as described above, access hole 158 may be present in one or more of the door panels, and may be aligned and/or adjacent channel 108 to facilitate insertion/removal of an insert 138.

Proceeding to block 610, process 600 may seal an access hole defined by the door panel with a removeable plug. For example, removeable plug 160 may be installed to access hole 158 after installation of the insert 138. Process 600 may then terminate.

Figure 6B:
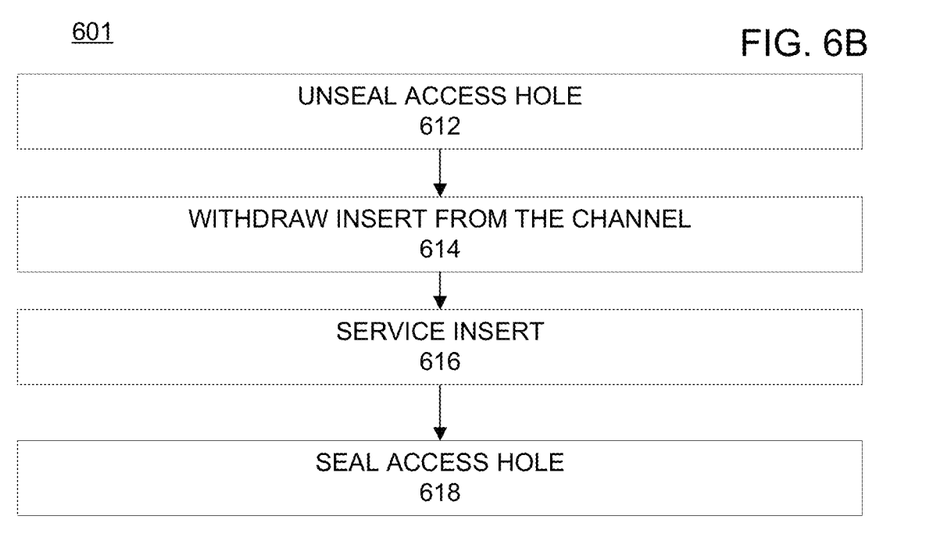
FIG. 6B illustrates an example method for servicing an insert for a belt seal assembly, in accordance with some disclosed embodiments.

Referring now to FIG. 6B, an example process 601 for servicing an insert for a belt seal is illustrated and described in further detail. Process 601 may begin at block 612, where an access hole is un-sealed or opened. For example, as discussed above, removable plug 160 may be removed from access hole 158. Process 601 may then proceed to block 614.

At block 614, process 601 may withdraw the insert from the channel. For example, as noted above, insert 138 may be longitudinally removed from the channel 108. In examples where a locking pin structure 152 is present, the locking pin structure 152 may be dislodged from the lock aperture 154. The insert 138 may be withdrawn from the channel 108.

Proceeding to block 616, the removeable plug 160 may be serviced and/or replaced. To the extent an insert 138 is able to be serviced, it may be re-inserted into the channel 108. To the extent the insert 138 is not capable of being fixed, a new insert 138 may instead be inserted into the channel 108, and the old/damaged insert discarded. Process 601 may then proceed to block 618.

At block 618, process 601 may seal the access hole. For example, the removeable plug 160 may be reinstalled to re-seal the door assembly 102, thereby preventing ingress of water or other liquid, dirt, debris, etc. into an interior of the door assembly. Process 601 may then terminate.

Figure 7:
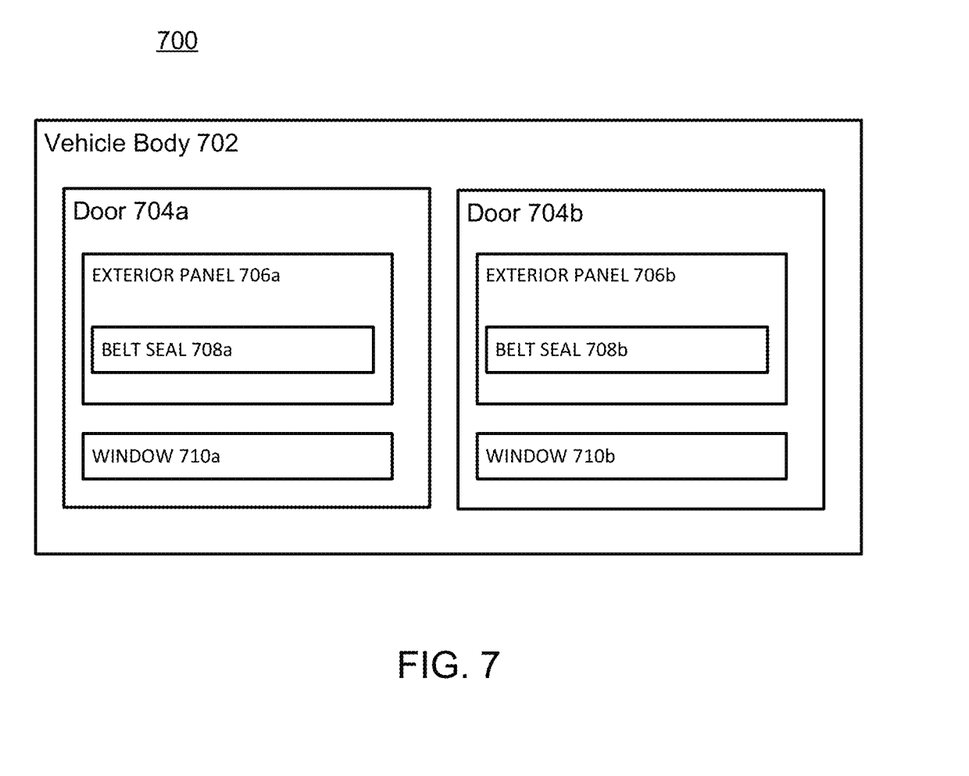
FIG. 7 illustrates an example vehicle assembly that includes one or more door assemblies, in accordance with some disclosed embodiments.

Referring now to FIG. 7, an example vehicle 700 is schematically illustrated that includes multiple door assemblies. Vehicle 700 may incorporate door assembly 102*a* of FIG. 1, door assembly 102*b* of FIG. 3, and/or may be manufactured using process 600 of FIG. 6, in accordance with some embodiments of the disclosure.

Figure 3:
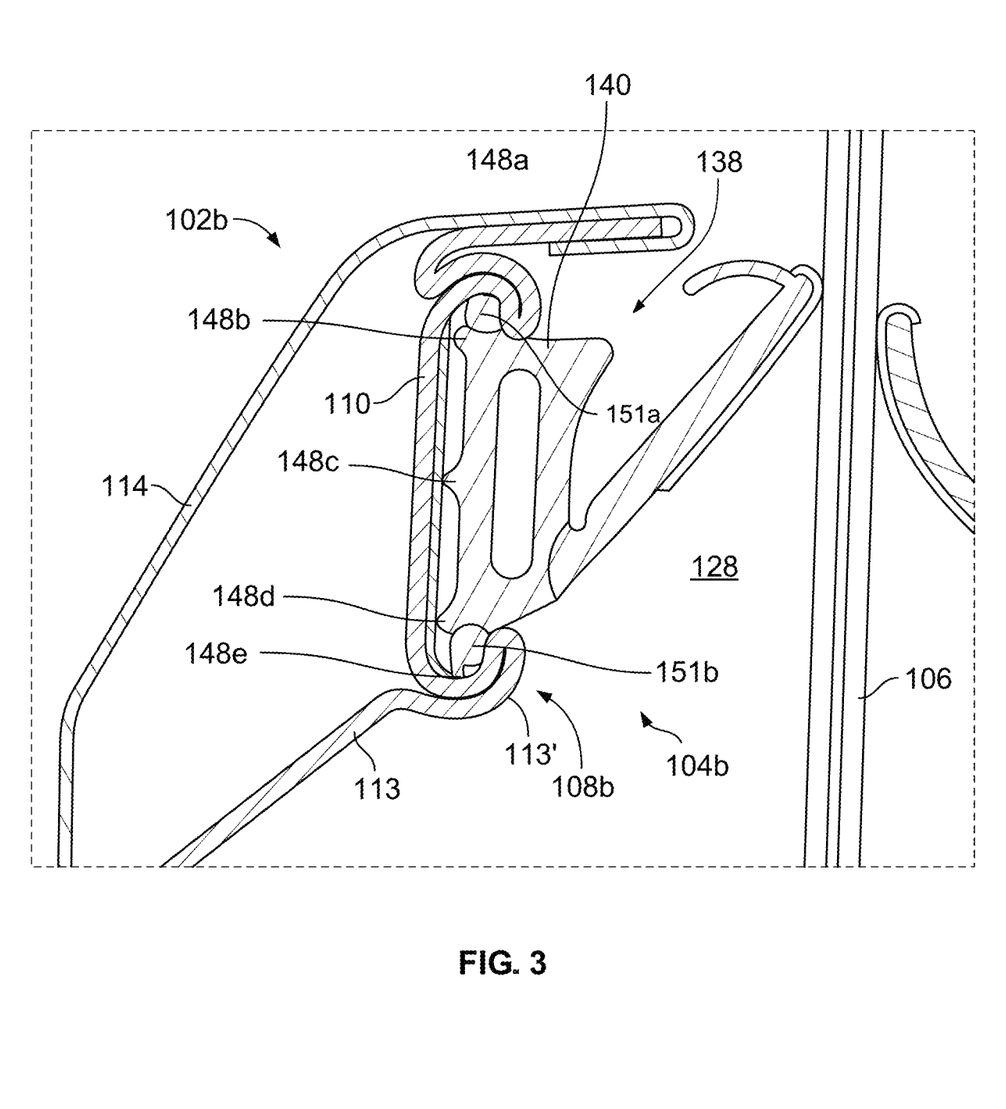
FIG. 3 illustrates another example door assembly incorporating a belt seal assembly that remains generally hidden from view and comprises a channel and insert to facilitate service and/or replaceability, in accordance with some disclosed embodiments.

Vehicle 700 includes a vehicle body 702. Attached to vehicle body 702 are door assemblies 704*a* and 704*b* (collectively, 704). In some embodiments, vehicle body 702 has additional door assemblies, e.g., positioned rearward of door assemblies 704*a* and 704*b*. Each of door assemblies 704*a* and 704*b* may include respective exterior panels 706*a* and 706*b*, proximate to each of windows 710*a* and 710*b*, respectively. Further, the door assemblies 704*a* and 704*b* may have belt seals 708*a* and 708*b*, respectively. Each of door panel assemblies 704 may incorporate any/all of the features of the door assembly 102*a* and/or door assembly 102*b* described above. For example, each of the door panel assemblies 704*a* and 704*b* may have a belt seal structure incorporating in whole or in part window seals 104*a* (e.g., as illustrated in FIG. 1) or 104*b* (e.g., as illustrated in FIG. 3) as belt seals 708*a* and 708*b*, respectively.

Example approaches herein may facilitate relatively easy installation. For example, the longitudinal installation and orientation of the channel 108 and insert 138 may facilitate reduction of parts (e.g., pins or other elements otherwise needed for positioning seals near windows). In one example, the elimination of pins from a seal facilitated an overall reduction in door width of approximately 7 millimeters. The longitudinal orientation of installation also facilitates relative reductions in cycle time in comparison to previous approaches, e.g., where disassembly of a door is required to install or replace a seal. To the extent the cross-section of the channel 108 and/or insert 138 is consistent, the channel 108 and insert 138 may be extruded or otherwise formed in relatively simple manufacturing operations. Example window seals 104 are also useful in a wide variety of different door architectures, e.g., frameless doors, framed doors, flush glazing, etc.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A vehicle window seal, comprising:
   a channel extending along a longitudinal axis and having a cross section opened toward a moveable window, wherein the channel is fixed in a door assembly and wherein the channel is aligned with an access hole arranged at a longitudinal end of the door assembly; and
   an insert comprising:
     a base receivable through the access hole and into the channel along the longitudinal axis, wherein the insert is removable from the channel along the longitudinal axis and through the access hole; and
     a sealing lip extending laterally out of the channel to contact the moveable window.

2. The vehicle window seal of claim 1, wherein the base comprises at least one protrusion configured to contact one or more inner surfaces of the channel to retain the insert in the channel by creating friction between the at least one protrusion and the one or more inner surfaces.

3. The vehicle window seal of claim 2, wherein the at least one protrusion comprises a plurality of protrusions, each extending in a different direction from the base.

4. The vehicle window seal of claim 1, wherein the channel defines a c-shaped cross section.

5. The vehicle window seal of claim 1, wherein the channel defines opposing interior surfaces engaged by upper and lower protrusions of the base.

6. The vehicle window seal of claim 1, wherein the base defines a hollow cross section, the sealing lip defined by an arm extending away from the hollow cross section, wherein the base comprises one or more protrusions configured to contact one or more inner surfaces of the channel.

7. The vehicle window seal of claim 1, wherein the moveable window comprises glass, and wherein the sealing lip comprises a layer of wear resistant material that prevents marks from appearing on the glass.

8. The vehicle window seal of claim 1, wherein the base defines a locking pin structure configured to extend through a lock aperture defined by the channel.

9. The vehicle window seal of claim 8, wherein the locking pin structure extends laterally away from the moveable window.

10. The vehicle window seal of claim 8, wherein the locking pin structure is located longitudinally on the base such that the locking pin structure is received in the lock aperture when the base is fully inserted into the channel.

11. The vehicle window seal of claim 1, wherein the channel comprises a locator tab configured to limit insertion of the base into the channel along the longitudinal axis.

12. The vehicle window seal of claim 1, further comprising a door panel having an interior surface defining the channel.

13. A door assembly for a vehicle, comprising:
an exterior door panel having a visible exterior surface extending toward a window opening for a moveable window, the exterior door panel having an interior surface;
an access hole defined by the door assembly at a longitudinal end of the door assembly; and
a window seal, comprising:
a channel extending along a longitudinal axis and along the interior surface, the channel having a cross section opened toward the moveable window, wherein the channel is aligned with the access hole; and
an insert comprising:
a base receivable through the access hole and into the channel along the longitudinal axis, wherein the insert is removable from the channel along the longitudinal axis and through the access hole; and
a sealing lip extending laterally out of the channel to contact the moveable window.

14. The door assembly of claim 13, further comprising a removeable plug configured to seal the access hole before or after the insert is received in the channel.

15. The door assembly of claim 13, wherein the base defines a locking pin structure configured to extend through a lock aperture defined by the channel; and
wherein the channel comprises a locator tab configured to limit insertion of the base into the channel along the longitudinal axis.

16. The door assembly of claim 15, wherein the locking pin structure is integrally formed with the base, wherein the locking pin structure is located longitudinally on the base such that the locking pin structure is received in the lock aperture when the base is fully inserted into the channel.

17. A method of manufacturing a door assembly, the method comprising:
positioning a channel, extending along a longitudinal axis, along an interior surface of a door panel such that the channel is fixed in the door assembly, wherein the channel comprises a cross section opened toward a moveable window, and wherein the channel is aligned with an access hole arranged at a longitudinal end of the door assembly; and
inserting a base of an insert through the access hole and into the channel along the longitudinal axis, the insert comprising a sealing lip extending laterally out of the channel to contact the moveable window, wherein the insert is removable from the channel along the longitudinal axis through the access hole.

18. The method of claim 17, further comprising sealing the access hole with a removeable plug.

19. The method of claim 17, further comprising limiting insertion of the base of the insert into the channel along the longitudinal axis with a locator tab of the channel, wherein the base of the insert defines a locking pin structure configured to extend through a lock aperture defined by the channel when the insert is fully inserted into the channel along the longitudinal axis, wherein the locking pin structure is integrally formed with the base.

* * * * *